May 8, 1962     H. A. DUDLEY     3,033,613
SEAT COVER
Filed June 5, 1961
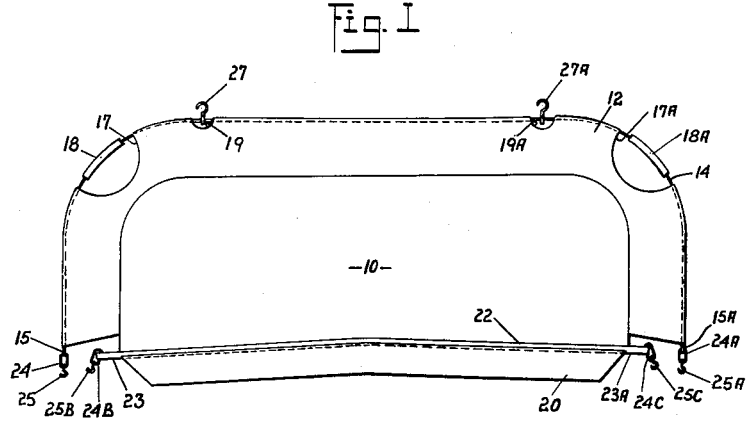
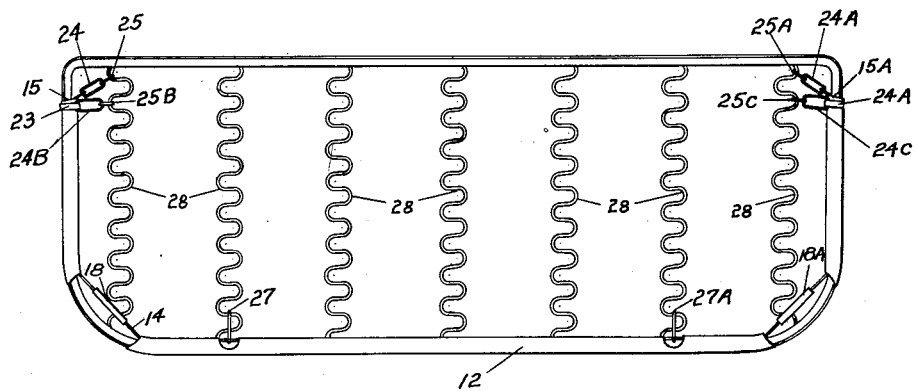
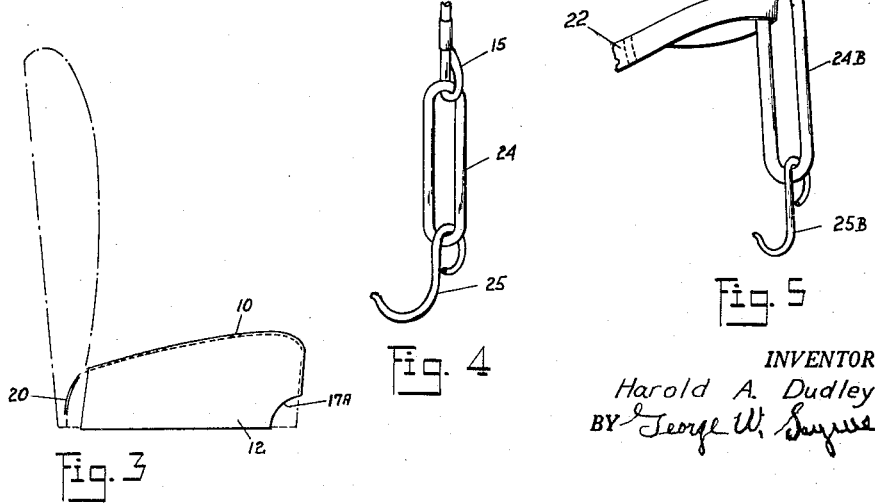
INVENTOR.
Harold A. Dudley
BY George W. Saywell
ATTORNEY 3,033,613
SEAT COVER
Harold A. Dudley, Fremont, Ohio, assignor to The S. E. Hyman Company, Fremont, Ohio, a corporation of Ohio
Filed June 5, 1961, Ser. No. 114,850
4 Claims. (Cl. 297—219)

This invention relates generally to covers for seat cushions and the like, and more particularly relates to improvements in the construction of seat covers to enhance the facility of installation.

Heretofore, covers made for seat cushions in automobiles and the like have been relatively complex in construction and assembly requiring a multiplicity of ties and installation hooks which made installation difficult and time consuming. It is, therefore, a principal object of this invention to provide a simplified seat cover construction which has the advantage of economy in manufacture as well as in time of installation without sacrificing either the esthetic or the utilitarian features of the installation.

Briefly, in accordance with this invention, there is provided a cover for a seat cushion which embodies a main panel adapted to overlie the cushion top with a marginally extending skirt on all but the rear edge adapted to overlie the sides of the cushion. The edge of the skirt is provided with a reinforcing member having elastic members for securing the cover and skirt to the cushion. The remaining edge of the main panel is preferably bowed inwardly and is also provided with a reinforcing member from which extends a back band adapted for interlocking coaction between the seat cushion and a co-operating back rest. The latter reinforcing member is also provided with elastic members for securing the cover to the cushion. The elastic connectors coact with the reinforcing members and the main panel and skirt to provide a snug fitting cover for the cushion which is securely held in place thereon. In the preferred embodiment, suitable cut-outs are provided in the skirt to accommodate the corners of the cushion. Assembly is facilitated by virtue of the necessity of engaging only the elastic connectors with the seat cushion once the cover is in place thereon.

In the drawings:

FIG. 1 is a plan view of the seat cover of this invention;

FIG. 2 is a plan view of the underside of a seat cushion with the cover of this invention secured in place;

FIG. 3 is a diagrammatic side elevation of a seat cushion and back rest showing the manner in which the cover is placed thereon; and FIGS. 4 and 5 are enlarged views of elastic cover securing members carried by corresponding cover reinforcing members.

Referring now more particularly to FIG. 1 of the drawings, there is shown in greater detail a seat cover constructed in accordance with this invention. In the preferred embodiment shown, the cover consists of a main panel 10 made of suitable fabric or other protective material and a marginal portion extending from three adjacent edges of the main panel to provide a skirt portion 12. The skirt portion 12 may be integral with or otherwise suitably secured to the edges of the main panel and is adapted to overhang and cover the sides of a seat cushion as diagrammatically shown in part in FIG. 3 of the drawings. The extended skirt portion 12 carries along its free edge a reinforcing member 14. The reinforcing member 14 may be a sash cord or the like, which in the preferred embodiment shown in FIG. 1 is sewn into a hem along the free edge of the skirt 12. Also in the preferred embodiment, the corners of the skirt portion 12 are cut out as shown at 17 and 17A to accommodate the bottom corners of the cushion as best shown in part in FIG. 3 of the drawings. To protect the reinforcing sash cord 14 at the cut-out portions of the skirt portion 12, the sash cord is provided with suitable tubular covers 18 and 18A which protect the cord against fraying during installation and thereafter. Additional cut-out portions 19 and 19A are provided to accommodate fastening members as will be hereinafter described in greater detail.

The remaining edge of the main panel 10 is provided with a back band 20 which has beveled corners permitting the band to be inserted for holding coaction between the seat cushion and a coacting back rest as best shown diagrammatically in FIG. 3 of the drawings. The back band 20 may be integral with or otherwise secured to the remaining edge of the main panel 10 and this edge or its juncture with the back band is preferably bowed inwardly from its extremities slightly for a purpose to be hereinafter more fully described. This juncture between the back band 20 and the remaining edge of the main panel 10 is also provided with a reinforcing member in the form of a band or tape 22 which is sewn or otherwise suitably secured thereto. As is readily apparent, the resulting seat cover is of a relatively simple construction embodying a main panel, a marginal skirt along three sides and a back band with reinforcing members as previously described.

Referring now to FIG. 1 in conjunction with FIGS. 2 and 3, it is noted that the extremities of each of the reinforcing members 14 and 22 are respectively provided with elastic members in the form of continuous loops 24, 24A and 24B, 24C, each of which in turn carry suitable hooks 25, 25A and 25B, 25C adapted for engagement with coacting portions of the supporting seat cushion. The reinforcing member 14 is provided with loops 15 and 15A at its extremities, each of which are reinforced against fraying by suitable tubular clips 26 and 26A as best shown in FIG. 4, and the extremities of the tape or band 22 are also provided with loops 23 and 23A as best shown in FIG. 5 of the drawings. Additional fasteners in the form of suitable hooks 27 and 27A are carried by the reinforcing member 14 in the skirt openings formed by the cut-out portions 19, 19A.

Conventional seat cushions of the type of which the cover of this invention will be applied contain resilient top-supporting members, such as spring members 28 and the like, which are generally exposed through the bottom of the cushion as diagrammatically shown in FIG. 2 of the drawings. In installing the seat cover of this invention on a cushion of the type shown in FIGS. 2 and 3 of the drawings, the main panel 10 is placed in surmounting relation over the top of the cushion with the skirt portion 12 depending downwardly along the sides of the cushion; taking care that the cut-out portions 17 and 17A of the skirt are located to accommodate the bottom corners of the cushion. The back band 20 of the cover is inserted between the coacting back rest and cushion as best shown in FIG. 3, and the reinforced edge of the skirt portion 12 is preferably overlapped and looped under the bottom frame of the cushion as best shown in FIG. 2 of the drawings. When assembled in this position, the elastic loops 24, 24A at the extremities of the skirt-reinforcing member 14 are extended under tension and the hooks 25, 25A are engaged beneath the cushion on the exposed springs. Similarly, the hooks 27, 27A are engaged by adjacent spring members 28 beneath the cushion. The elastic loops 24B, 24C on the reinforcing band or tape 22 along the back band 20 are also extended under tension with their hooks 25B, 25C engaging the springs 28 beneath the cushion. Because of the elasticity of the loops and their coaction with the reinforcing members, the skirt portion of the cover, as well as the main panel portion, can be drawn very tightly into form-fitting relation on the cushion. When the reinforcing member 14 is placed under tension in this manner, the inwardly bowed central portion is straightened out and the center portion of the main panel 10 is held in place without the necessity of a central fastener. Furthermore, the cover will yield when sat upon without tearing and return to its initial form-fitting configuration surmounting the cushion when the pressure is removed.

Thus, there has been provided in accordance with this invention an improved construction for a seat cushion cover that permits simplified and more efficient installation. There is a minimum of fastening members and their arrangement in conjunction with certain reinforcing members provides a form-fitting cover which has the ability of yielding under load without adversely affecting the security of the installation.

I have shown and described what I consider to be the preferred embodiment of my invention along with suggested modifications, and it is clear that other changes and modifications may be made by those skilled in the art without departing from the scope of my invention as defined by the appended claims.

I claim:

1. A cover for a seat cushion having a top with depending sides comprising, a main panel portion adapted to surmount and cover the cushion top, said main panel having a marginal skirt portion adapted to surmount and cover all but one of the cushion sides, said skirt portion being of greater transverse dimension than the corresponding cushion sides and coacting when assembled to underly the cushion along the corresponding sides, the remaining edge of the said main panel bowed inwardly from its extremities and having a band portion extending marginally therefrom, means reinforcing the free edge of said skirt portion, other reinforcing means extending along said bowed edge and coacting between said remaining edge of said main panel and said band, and cushion fastening means carried respectively by the extremities of each of said reinforcing members and adapted to coact under tension to draw said inwardly bowed remaining edge portion into substantially a straight line along the cushion, thereby to secure the cover in snug-fitting relation on the cushion.

2. The cover of claim 1 wherein the free edge of said marginal skirt portion has cut-out portions disposed in predetermined spaced relation corresponding to bottom corners of the seat cushion and adapted to accommodate the cushion corners therethrough, and wherein said reinforcing means includes a continuous reinforcing member extending in exposed relation across the cut-out portions and adapted to coact therewith beneath the cushion corners to hold the cover in predetermined position on the cushion.

3. The cover of claim 2 wherein the free edge of said marginal skirt portion has cut-out portions disposed in predetermined spaced relation along the front side and between the cut-out corner portions and wherein said reinforcing means includes a continuous reinforcing member extending exposed across said intermediate cut-out portions, respectively, and means carried by the exposed intermediate portions of said continuous reinforcing member for holding coaction with adjacent portions of the cushion.

4. A cover for a seat cushion having a generally curved top with depending sides and a bottom exposing resilient top-supporting member comprising, a main panel portion corresponding and adapted to surmount and cover the top of said cushion, a marginal skirt portion extending from all but one of adjacent edges of said main panel and adapted to depend therefrom in surmounting covering relation over the corresponding adjacent sides of said cushion, the remaining edge of said main panel being curved inwardly from its extremities to provide a bowed configuration, a continuous reinforcing member carried by the extended free edges of said marginal skirt portion, first means elastically carried by the extremities of said reinforcing member and adapted to engage the resilient top-supporting members beneath the cushion, a band portion extending marginally from the remaining edge of said main panel and adapted to coact in inserted relation between the cushion and an adjacent back rest, a second reinforcing member disposed along the remaining inwardly curved edge of said main panel, and second means elastically carried by the extremities of said second reinforcing member and adapted to engage the resilient top-supporting members beneath the cushion, the engagement of each of said first and second means with the resilient top-supporting members coacting to place each of said reinforcing members respectively under tension sufficient to maintain the cover in snug surmounting relation on the cushion with the second reinforcing member and the remaining edge of the main panel extended under tension in a substantially straight line.

References Cited in the file of this patent

UNITED STATES PATENTS

| | | |
|---|---|---|
| 1,492,993 | Lasecki | May 6, 1924 |
| 1,836,302 | Bloomfield | Dec. 15, 1931 |
| 1,861,455 | Schwartz | June 7, 1932 |
| 1,996,575 | Fry | Apr. 2, 1935 |
| 2,202,065 | Peebles | May 28, 1940 |
| 2,238,795 | Katzner | Apr. 15, 1941 |
| 2,350,359 | Krasnov | June 6, 1944 |
| 2,373,071 | Waranch | Apr. 3, 1945 |
| 2,567,550 | Clark et al. | Sept. 11, 1951 |
| 2,652,886 | Richards | Sept. 22, 1953 |
| 2,789,630 | Lyle | Apr. 23, 1957 |
| 2,807,314 | Larkin | Sept. 24, 1957 |
| 2,811,199 | Morrill | Oct. 29, 1957 |
| 2,878,490 | Schneider | Mar. 24, 1959 |